United States Patent
Yamada

(10) Patent No.: US 12,173,830 B2
(45) Date of Patent: Dec. 24, 2024

(54) PIPE INTERIOR INSPECTION ROBOT

(71) Applicants: EBARA Environmental Plant Co., Ltd., Tokyo (JP); HIBOT CORPORATION, Tokyo (JP)

(72) Inventor: Hiroya Yamada, Tokyo (JP)

(73) Assignees: EBARA ENVIRONMENTAL PLANT CO., LTD, Tokyo (JP); HIBOT CORPORATION, Tokyo (JP)

( * ) Notice: Subject to any disclaimer, the term of this patent is extended or adjusted under 35 U.S.C. 154(b) by 464 days.

(21) Appl. No.: 17/309,507

(22) PCT Filed: Nov. 29, 2019

(86) PCT No.: PCT/JP2019/046925
§ 371 (c)(1),
(2) Date: Jun. 2, 2021

(87) PCT Pub. No.: WO2020/116360
PCT Pub. Date: Jun. 11, 2020

(65) Prior Publication Data
US 2022/0057040 A1    Feb. 24, 2022

(30) Foreign Application Priority Data
Dec. 3, 2018 (JP) ................................. 2018-226337

(51) Int. Cl.
*F16L 55/26* (2006.01)
*B61B 13/10* (2006.01)
*B62D 57/02* (2006.01)
*F16L 55/32* (2006.01)
*G01N 29/265* (2006.01)
*F16L 101/30* (2006.01)

(52) U.S. Cl.
CPC ............ *F16L 55/265* (2013.01); *B61B 13/10* (2013.01); *B62D 57/02* (2013.01); *F16L 55/32* (2013.01);
(Continued)

(58) Field of Classification Search
CPC ... F16L 55/26–38; F16L 55/265; F16L 55/48; F16L 2101/30; B61B 13/10; B62D 57/02; G01N 29/265; G01N 2291/2626
See application file for complete search history.

(56) References Cited

U.S. PATENT DOCUMENTS 5,172,639 A    12/1992  Wiesman et al.
5,423,230 A *  6/1995   Olander ................ H04N 7/185
                                                     348/E7.088
(Continued)

FOREIGN PATENT DOCUMENTS

EP    3025922 A1    6/2016
JP    S57-102782 A  6/1982
(Continued)

OTHER PUBLICATIONS

WIPO, International Search Authority, International Search Report (with English translation) and Written Opinion dated Feb. 18, 2020 in International Patent Application No. PCT/JP2019/046925, 11 pages.
(Continued)

*Primary Examiner* — Nguyen Q. Ha
(74) *Attorney, Agent, or Firm* — MASUVALLEY & PARTNERS; Peter Martinez

(57) ABSTRACT

Provided is a pipe interior inspection robot that has characteristics of having an extremely simple device structure to easily achieve dustproof and waterproof properties, being able to pass through a pipe bent in any direction, and enabling the selection of the advancing direction.
A pipe interior inspection robot for inspecting the inside of a pipe branched from a pipe header, the robot including:
1) a moving means having a structure capable of being introduced from a pipe base, which is an inlet of the pipe header, and capable of moving in the pipe header and being fixed to a pipe wall inside the pipe header at a desired position;

(Continued)

2) a mechanism for specifying a position of a pipe to be inspected; and
3) a mechanism for inspecting a condition inside the pipe to be inspected.

8 Claims, 9 Drawing Sheets

(52) U.S. Cl.
CPC ........ *G01N 29/265* (2013.01); *F16L 2101/30* (2013.01); *G01N 2291/2636* (2013.01)

(56) References Cited

U.S. PATENT DOCUMENTS

| | | |
|---|---|---|
| 6,035,786 A | 3/2000 | Mckay et al. |
| 9,869,420 B2 * | 1/2018 | Penza .................. F16L 55/265 |
| 11,519,546 B2 * | 12/2022 | Louise-Alexandrine Baron ......... F16L 55/30 |
| 2015/0375276 A1 * | 12/2015 | Sivacoe ................ F16L 55/265 15/104.09 |
| 2016/0123517 A1 | 5/2016 | Hirose et al. |

FOREIGN PATENT DOCUMENTS

| | | |
|---|---|---|
| JP | S63-275473 A | 11/1988 |
| JP | H08-133073 A | 5/1996 |
| JP | H08-189608 A | 7/1996 |
| JP | 2015-024748 A | 2/2015 |
| JP | 2015-224001 A | 12/2015 |

OTHER PUBLICATIONS

EPO, European Search Report dated Dec. 9, 2021 for EP application No. 19893219, 2 pages.

* cited by examiner

PIPE INTERIOR INSPECTION ROBOT

RELATED APPLICATIONS

This application is the U.S. National Phase of and claims priority to International Patent Application No. PCT/JP2019/046925, International Filing Date Nov. 29, 2019; which claims benefit of Japanese Patent Application No. 2018-226337 filed Dec. 3, 2018 both of which are incorporated herein by reference in their entireties.

TECHNICAL FIELD

The present invention relates to a pipe interior inspection robot that can freely move inside a pipe having a bend and a branch and is for inspecting the inside of the pipe. In particular, the present invention relates to an inspection device for a boiler tube.

BACKGROUND ART

Generally, a boiler has many water pipes and in-layer pipes, water pass through the pipes, and the heat of sand that burns fuel and the heat of burnt exhaust gas are transferred to the water pipes and the in-layer pipes to convert the heat into steam.

A pipe in which the water pipes and the in-layer pipes are collected is called a pipe header. There has been a strong demand for a technique in which in the inspection of the pipes and the in-layer pipes constituting the boilers, the inside of the pipes can be inspected and repaired without cutting the pipes. For achieving this, it is necessary to provide a device moving in a pipe, capable of inserting a device for work inspection into a pipe header from an opening of the pipe and conveying the device for work inspection to a desired position.

CITATION LIST

Patent Document

Patent Document 1: JP-A-2015-024748
Patent Document 2: JP-A-2015-224001

Patent Document 1 discloses a pipe interior moving device that was previously applied for a patent by the applicant of the present invention, can freely move inside a pipe having a bend or a branch, and can convey a working device configured to inspect and repair the inside of the pipe.

Patent Document 2 discloses a pipe interior moving device provided with: at least three sets of wheel units arranged vertically in the rotational direction; and at least two sets of joints coupling at least three sets of wheel units together so as to be rotationally movable. Each of at least three sets of wheel units has a wheel, a drive part that rotationally drives the wheel, a first frame fixed to the drive part, and at least one second frame attached to the drive part so as to be rotationally movable. A bending generator, which applies a driving force for bending the first frame and the second frame in a V-shape, is provided between the first frames and the second frames of at least three sets of wheel units. The two sets of joints are configured to be rotationally movable in a direction substantially orthogonal to the direction of the rotational movement of the second frame.

Therefore, according to the pipe interior moving device disclosed in Patent Document 1, it is possible to provide a pipe interior moving device that has characteristics of having an extremely simple device structure to easily achieve dustproof and waterproof properties, being able to pass through a pipe bent in any direction without controlling the posture of the device, and enabling the selection of the advancing direction in a T-junction pipe.

However, the device described in Patent Document 1 has the following problems. The pipe interior moving device disclosed in Patent Document 1 has a problem that in a case where the device is inserted from a pipe base which is an inlet of a pipe header where a pipe to be inspected is branched, for example, when the distance between the respective wheels of the front wheel unit and the second wheel unit from the front in a device having three sets of wheel units is larger than the diameter of the pipe header, the device cannot be inserted into the pipe header. On the other hand, in a case where the distance between the wheels is shorter than the diameter of the pipe header, the device can be inserted into the pipe header, but there is a problem that when each wheel unit grips onto the wall inside the pipe header, the angle (opening angle) formed between the axle of the front (first) wheel unit and the axle of the last (third) wheel unit becomes excessively small with respect to the axle of the intermediate (second) wheel unit, and stable traveling and gripping cannot be achieved. Further, even when the pipe interior moving device is conveyed to the position of the pipe to be inspected, there is a problem that in the case of inserting a device for inspecting the condition of the pipe to be inspected into the pipe to be inspected, the pipe interior moving device cannot be accurately fixed to the wall inside the pipe header at a predetermined position.

The pipe interior moving device of Patent Document 2 is provided with: at least three wheels rotationally driven by a motor and arranged longitudinally and vertically in the rotational direction; at least two joints slidably coupling at least three wheels together in the horizontal and vertical directions; and two steering cables, each having one end fixed to the axle support of the wheel located at the front in the traveling direction, passing the axle supports of the remaining wheels, the other end of the wheel, and both sides of the joints, passing through the inside of a tube wire which has one end fixed to a fixed plate fixed to a fixed part of the wheel located at the rear head and has the other end fixed to a frame of a tension adjuster, and having the other end fixed to a cable traction device in the tension adjuster. Further, a sensor for measuring the compression force acting between the tube wire and the frame of the tension adjuster is provided between the tube wire and the frame of the tension adjuster, and the two steering cables stretched to the right and left of the wheel with respect to the rotational advancing direction of at least three wheels are provided with a rotary cable guide member configured to replace the right steering cable on the way stretched backward from the axle support of the front wheel to the left and the left steering cable to the right.

However, the pipe interior moving device of Patent Document 2 has a complicated structure and has the same problems as those described above regarding Patent Document 1.

SUMMARY OF THE INVENTION

Problems to be Solved by the Invention

A pipe interior inspection robot of the present invention has been made in view of such conventional problems. More specifically, it is an object of the present invention to provide a pipe interior inspection robot that has characteristics of having an extremely simple device structure to easily achieve dustproof and waterproof properties, being able to pass through a pipe bent in any direction, and enabling the selection of the advancing direction. The pipe interior inspection robot has joints, and thus, even when the diameter of the pipe header is smaller than the distance between the wheels of the wheel units, the device can be easily inserted from a pipe base, which is the inlet of the pipe header, and move to the position of a pipe to be inspected. When the three sets of wheel units grip onto the wall inside the pipe header, the joint located at the intermediate position of the arm connecting the intermediate (second) wheel unit and each of the first and third wheel units makes the angle (opening angle) formed between the axles of the first and third wheel units sufficiently large with respect to the axle of the intermediate (second) wheel unit. Thus, the pipe interior inspection robot of the present invention can achieve stable traveling and gripping.

Solutions to the Problems

A pipe interior inspection robot of the present invention is a pipe interior inspection robot for inspecting the inside of a pipe branched from a pipe header, the robot including: 1) a moving means having a structure capable of being introduced from a pipe base, which is an inlet of the pipe header and capable of moving in the pipe header and being fixed to a pipe wall inside the pipe header at a desired position; 2) a mechanism for specifying a position of a pipe to be inspected; and 3) a mechanism for inspecting a condition inside the pipe to be inspected.

Further, in the present invention, there is also provided a pipe interior inspection robot in which the moving means includes at least three sets of wheel units and a pair of arms connecting from a wheel unit located at an intermediate position of the three sets to adjacent wheel units, the pair of arms each have a link A extending from the wheel unit located at the intermediate position to each of the wheel units, a link B extending from each of the wheel units to the wheel units located at the intermediate position, and a joint located between the link A and the link B, being freely rotated, and fixable at an arbitrary position, and the coupling is made to the adjacent wheel units via the pair of arms each having the link A, the link B, and the joint located between the link A and the link B.

Further, in the present invention, there is also provided a pipe interior inspection robot in which the joint includes a mechanism for rotating around a pitch shaft and a mechanism for rotating around a yaw shaft.

Further, in the present invention, there is provided a pipe interior inspection robot in which the joint includes a motor for rotating the joint on the yaw shaft.

Further, in the present invention, there is provided a pipe interior inspection robot in which the moving means has a function for locking the rotation of the three sets of wheels when the three sets of wheel units are in pressure-contact with and grip on the pipe wall inside the pipe header by a bending force of the arms, and releasing the lock when the three sets are to be moved.

Further, in the present invention, there is provided a pipe interior inspection robot in which when the moving means grips on a pipe wall inside the pipe header by a bending force of the arms and the three sets of wheel units, the moving means is able to remove the bending force of the arms to release the gripping.

Further, in the present invention, there is provided a pipe interior inspection robot in which the mechanism for inspecting the condition inside the pipe includes a water supply pipe for supplying water to the inlet of the pipe to be inspected, and a sensor for evaluating the condition inside the pipe to be inspected by utilizing a water flow generated by supplying water into the water supply pipe.

Further, in the present invention, there is provided a pipe interior inspection robot in which the sensor for evaluating the condition in the pipe to be inspected includes a sensor for detecting a thickness of the pipe to be inspected by using ultrasonic waves, and a cord that extends from the sensor and be equipped with one or more protrusions generating resistance to the water flow.

Further, in the present invention, there is provided a pipe interior inspection robot in which the mechanism for inspecting the condition in the pipe to be inspected has a structure for covering a vicinity of the inlet of the pipe to be inspected so as to prevent water leakage.

In the present invention, the pipe base means a short pipe provided for attaching a valve or a branch pipe to the pipe header. In the present invention, the pipe to be inspected includes both the pipe and the pipe header. For describing the present invention, the inspection in the pipe to be inspected will be described in detail, but the present invention is not limited thereto. It is also within the scope of the present invention to clean the inside of the pipe header and inspect the inside of the pipe header with a camera.

In the pipe interior inspection robot of the present invention, the moving means includes at least three sets of wheel units. A wheel unit located at the intermediate position of the three sets of wheel units is provided with a pair of arms connecting adjacent wheel units. The pair of arms each have a link A extending from the wheel unit located at the intermediate position to each of the wheel units, and a link B extending from each of the wheel units to the wheel units located at the intermediate position, and a joint located between the link A and the link B, being freely rotated, and fixable at an arbitrary position. The pair of arms, each having the link A, the link B, and the joint located between the link A and the link B, couples the adjacent wheel units together.

In the pipe interior inspection robot of the present invention, the joint includes a mechanism for rotating around a pitch shaft and a mechanism for rotating around a yaw shaft. The mechanism for rotating around the pitch shaft enables an upper portion and a lower portion constituting the joint to be rotated around the pitch shaft. The mechanism for rotating around the yaw shaft enables each wheel unit adjacent to the wheel unit located at the intermediate position of the three sets to be rotated around the yaw shaft.

The pipe interior inspection robot of the present invention may include a motor for driving the joint around the yaw shaft. Further, the pipe interior inspection robot can also be provided with a motor that enables the upper portion and the lower portion to be rotated around the pitch shaft. A device for measuring the rotational movement of the motor which enables rotation around the pitch shaft can be provided.

In the pipe interior inspection robot of the present invention, the moving means has a mechanism for locking rotation of the three sets of wheel units when the three sets of wheel units are in pressure-contact with and grip on the pipe wall inside the pipe header by a bending force of the arms, and releasing the lock when the three sets are to be moved.

In the pipe interior inspection robot of the present invention, when the three sets of wheel units grip on a pipe wall inside the pipe header by a bending force of the arms, the moving means is able to remove the bending force of the arms to release the gripping.

In the pipe interior inspection robot of the present invention, the mechanism for inspecting the condition inside the pipe includes a water supply pipe for supplying water to the inlet of the pipe to be inspected, and a sensor for evaluating the condition inside the pipe to be inspected by utilizing a water flow generated by supplying water into the water supply pipe.

In the pipe interior inspection robot of the present invention, the sensor for evaluating the condition in the pipe to be inspected includes a sensor for detecting a thickness of the pipe to be inspected by using ultrasonic waves, and a cord that extends from the sensor and be equipped with one or more protrusions generating resistance to the water flow.

In the pipe interior inspection robot of the present invention, the mechanism for inspecting the condition in the pipe to be inspected has a structure for covering a vicinity of the inlet of the pipe to be inspected so as to prevent water leakage.

Effects of the Invention

The pipe interior inspection robot of the present invention has an extremely simple device structure to easily achieve dustproof and waterproof properties. Also, the pipe interior inspection robot has characteristics of being able to pass through the bend and the like of the pipe header of the pipe bent in any direction, and enabling the selection of the advancing direction. Since the pipe interior inspection robot of the present invention has the joint portions, even when the diameter of the pipe header is smaller than the distance between the wheels of the wheel units, the device can be easily inserted from a pipe base, which is the inlet of the pipe header, and be moved to the position of a pipe to be inspected. Further, in the case of including three sets of wheel units, each wheel unit includes a joint at the intermediate position of an arm connecting the (second) wheel unit located at the intermediate position and each of the first and third wheel units at the time of gripping onto the wall inside the pipe header. In the pipe interior inspection robot of the present invention, the angle (opening angle) formed between the axles of the first and third wheel units becomes sufficiently large with respect to the axle of the (second) wheel unit located at the intermediate position, making it possible to achieve stable traveling and gripping.

DESCRIPTION OF THE EMBODIMENTS

Figure 1:
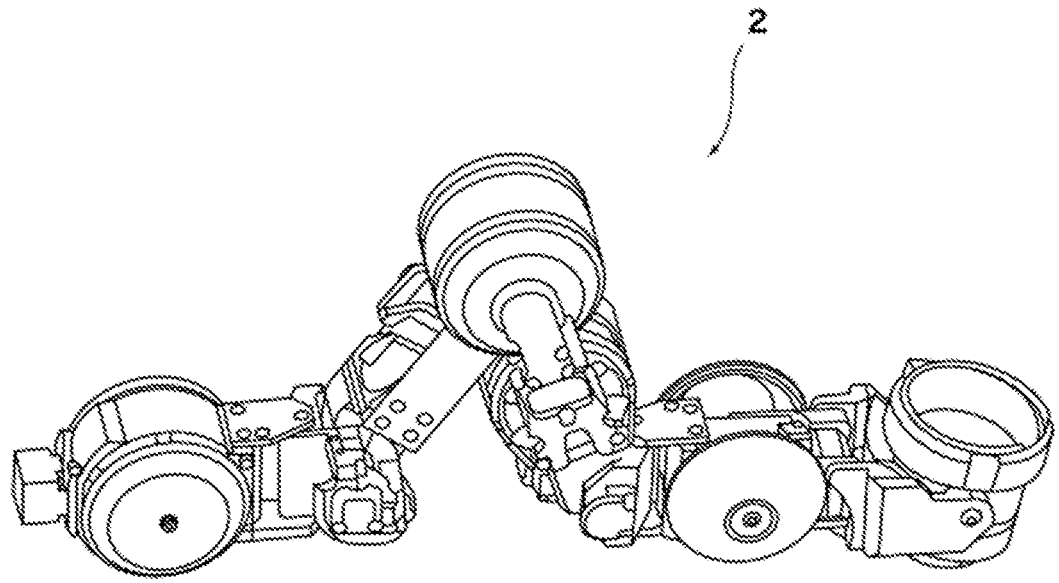
FIG. 1 is an external perspective view of a pipe interior inspection robot.

Embodiments of the pipe interior inspection robot according to the present invention will be described below with reference to FIGS. 1 to 18.

First, a first embodiment of the pipe interior inspection robot of the present invention will be described with reference to FIGS. 1 to 10.

A pipe interior inspection robot 1 according to the first embodiment of the present invention includes:

1) a moving means having a structure capable of being introduced from a pipe base that is an inlet of the pipe header and capable of moving in the pipe header and being fixed to a pipe wall inside the pipe header at a desired position;

2) a mechanism for specifying a position of a pipe to be inspected; and 3) a mechanism for inspecting a condition inside the pipe to be inspected.

The pipe interior inspection robot 1 according to the first embodiment of the present invention can be introduced from the pipe base which is the inlet of the pipe header. The pipe interior inspection robot has a structure capable of moving in the pipe header and being fixed to a wall inside the pipe header at a desired position. The pipe interior inspection robot includes: at least three sets of wheel units 2A, 2B, 2C; a pair of arms connecting the wheel units 2A, 2C adjacent to each other from the wheel unit 2B located at the intermediate position of the three sets; and freely rotatable and fixable joints. The pair of arms is made up of links A extending from the wheel unit 2B located at the intermediate position to the adjacent wheel units 2A, 2C, and links B extending from the wheel units 2A, 2C to the wheel unit 2B located at the intermediate position. The joint is located between the link A and the link B, can freely rotate, and can be fixed at an arbitrary position. The adjacent wheel units are coupled together via the pair of arms having the link A, the link B, and the joint located between the link A and the link B. The pipe interior inspection robot has the pair of arms extending from the wheel unit 2B located at the intermediate position to the respective wheel units 2A, 2C and coupled to the wheel unit 2B located at the intermediate position at the center so as to be rotationally movable. By the rotational movement of the pair of arms, the three sets of wheel units 2A-2C arranged in the longitudinal direction can be arranged so as to be folded into a V-shape. In this case, the length (substantially the length of the link A and the link B combined) of the arm, which is coupled to the wheel unit 2B located at the intermediate position so as to be rotationally movable, is larger than the diameter of the pipe header, but by the joint being provided, a gripping force to the wall inside the pipe header of the wheel unit during traveling or the like is exerted. Hence the distance between the wheel unit 2B located at the intermediate position and each adjacent wheel unit can be made appropriate. The position of the joint on the arm is determined in accordance with the lengths of the link A and the link B. For example, providing the joint at a position extremely close to the wheel unit 2B located at the intermediate position is not preferable for exerting the above effect.

The wheel unit 2B located at the intermediate position of the three sets of wheel units includes a motor, a wheel coupled to the outside so as to be rotationally movable in the radial direction of an output part of the motor with a predetermined gap and integrated with the output part of the motor, and junctions of the respective links A of the arms extending in the directions of the two adjacent wheel units, the joining portions being supported on the member of the motor so as to be rotationally movable. Further, the wheel unit 2B has a bending generation mechanism that applies a driving force for the bending in the V-shape around a point supporting the joining portions of the two links A so as to be rotationally movable.

Figure 8:
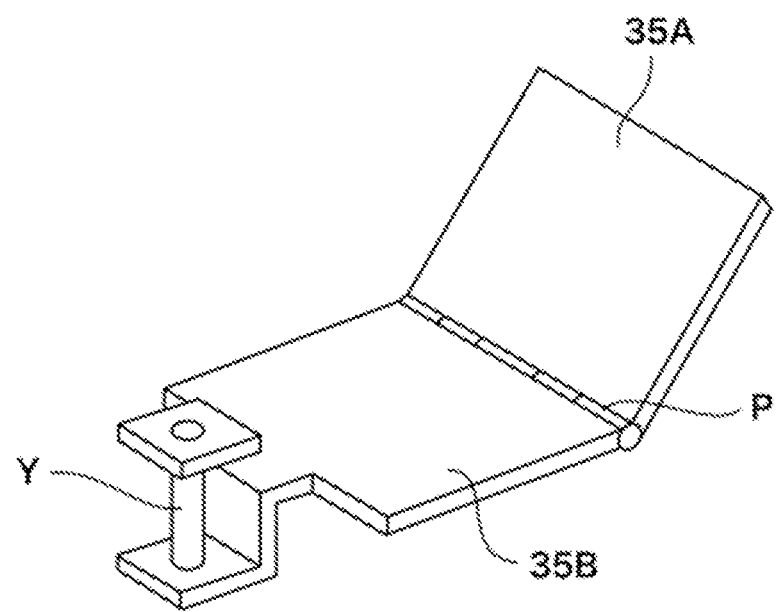
FIG. 8 is a perspective view of a joint.

The bending generation mechanism can be provided with a spring, a coil, a motor, or the like that applies a force in a direction in which the two link A portions approach each other. Further, in order to arrange the three sets of wheel units 2A, 2B, 2C so as to be bent in the V-shape, a mechanism for bending the link A and the link B is provided in the joint provided at the intermediate position of the arm connecting the wheel units 2A, 2B and the joint provided at the intermediate wheel position of the arm connecting the wheel units 2C, 2B (FIG. 8).

Figure 13:
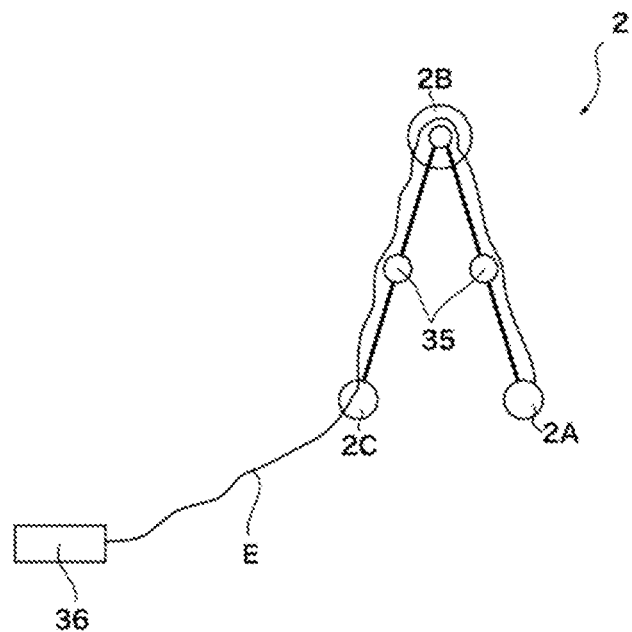
FIG. 13 is a diagram illustrating an example of controlling bending between arms by connecting each vehicle unit with a cable.

Further, when the spring is used for the rotational movement of the joint, a drive cable connecting the wheel units 2A, 2C via the wheel unit 2B can be provided to adjust the bending force (FIG. 13). In this manner, the angle between the two link A portions in the wheel unit 2B supporting the two link A portions so as to be rotationally movable can be controlled, and the rotational movement of the joint portion around the pitch shaft can be controlled to adjust the bending force.

Figure 2:
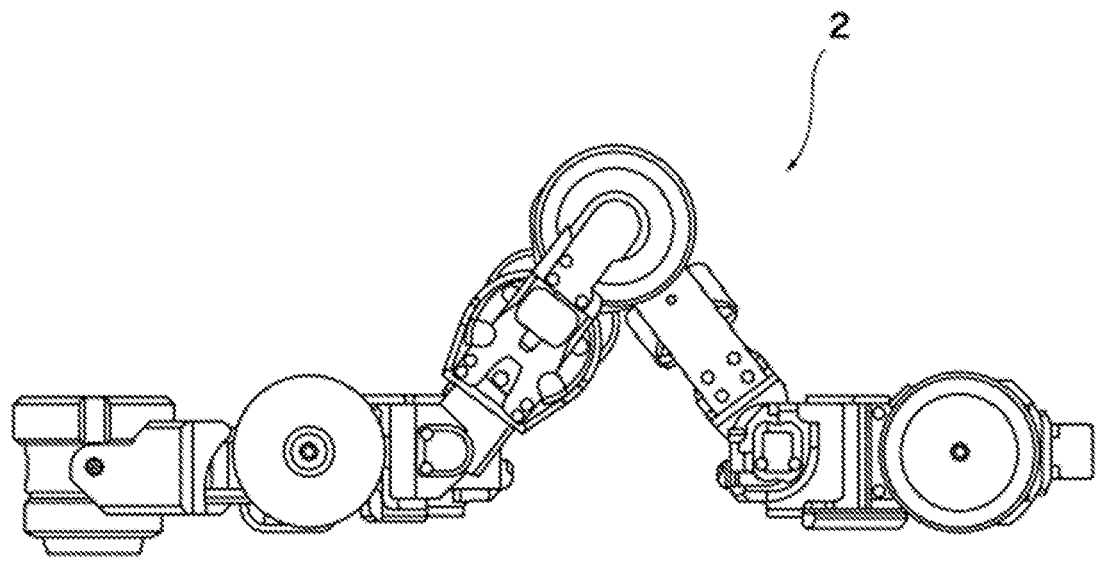
FIG. 2 is a side view of the pipe interior inspection robot.
Figure 3:
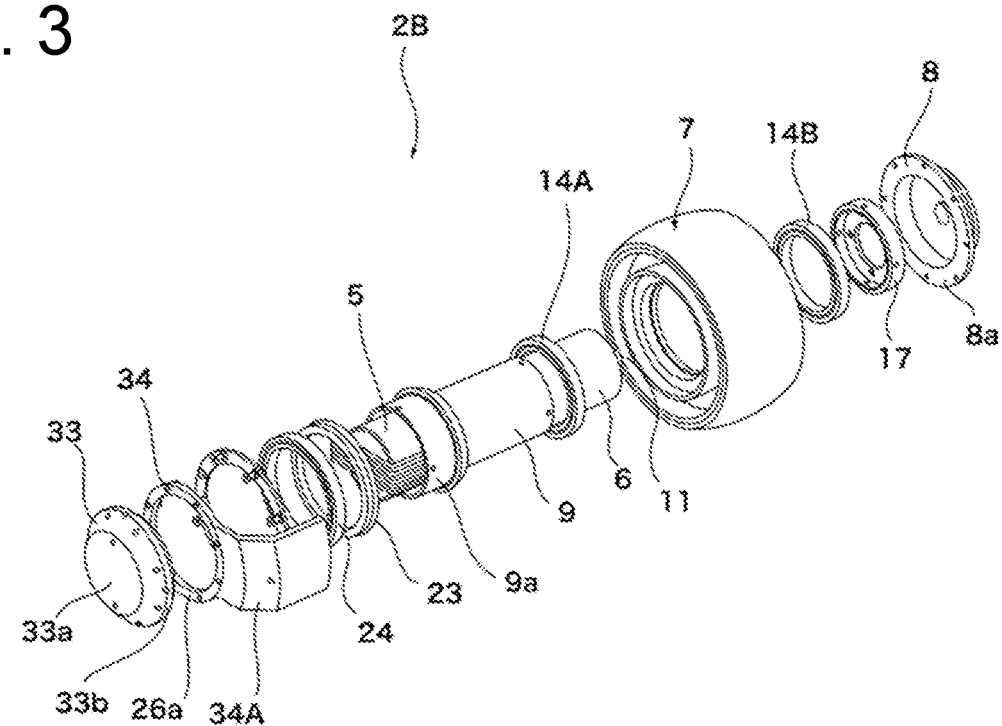
FIG. 3 is an exploded perspective view of a wheel unit located at the intermediate position of the pipe interior inspection robot illustrated in FIG. 1.
Figure 4:
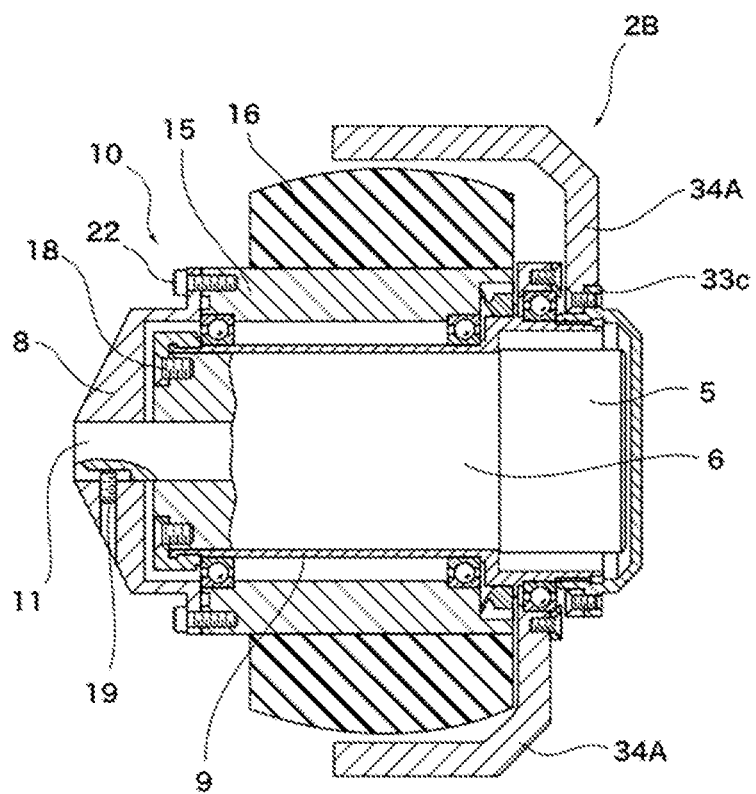
FIG. 4 is a cross-sectional view of the wheel unit located at the intermediate position of the pipe interior inspection robot illustrated in FIG. 1.
Figure 5:
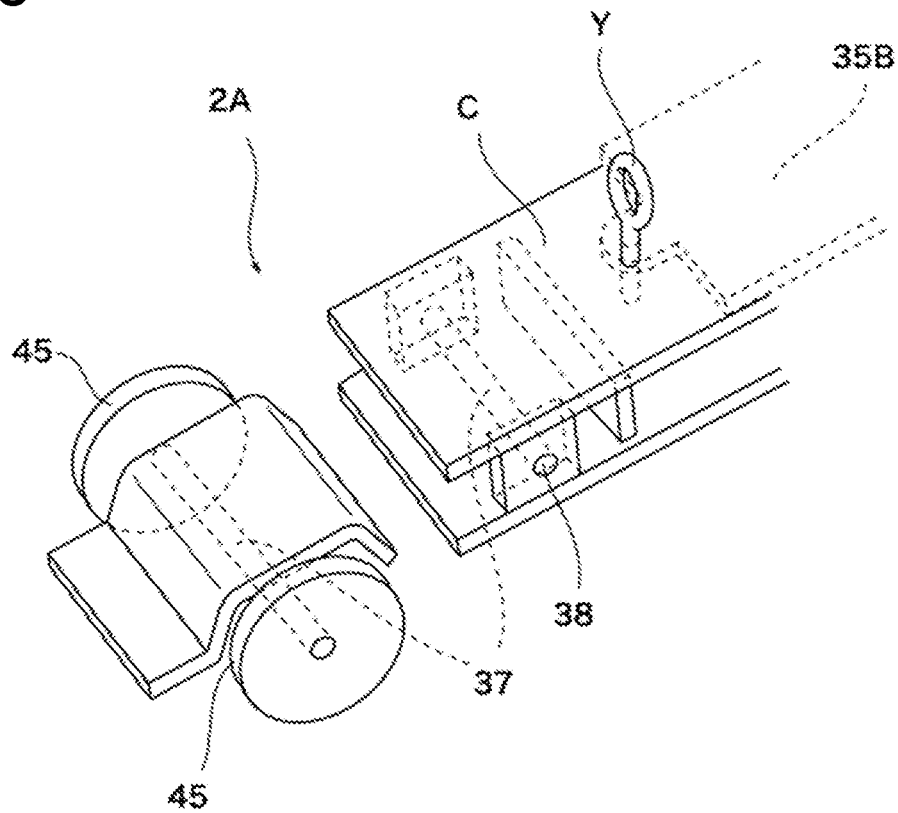
FIG. 5 is an exploded perspective view of a (foremost) wheel unit adjacent to the wheel unit located at the intermediate position of the pipe interior inspection robot illustrated in FIG. 1.
Figure 6:
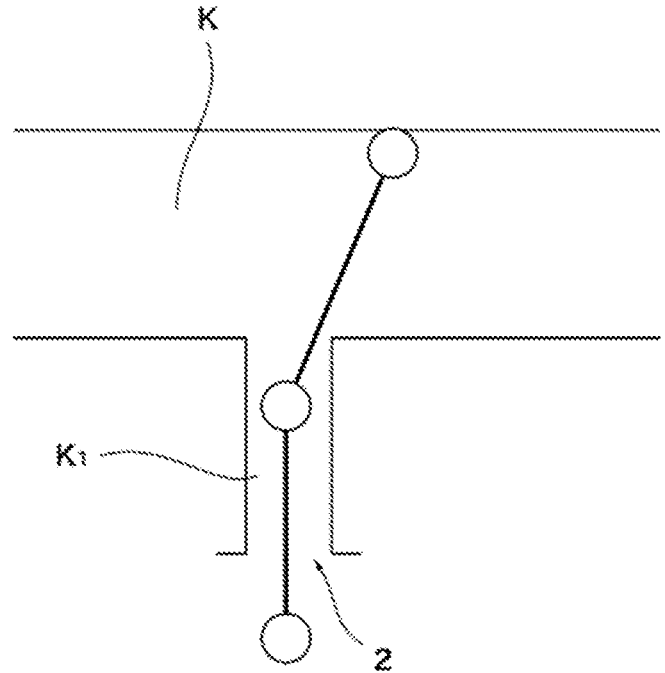
FIG. 6 is a schematic diagram illustrating a case in the prior art where a pipe interior moving device is inserted into a pipe header from a pipe base, which is an inlet of the pipe header, when the length between wheels is larger than the diameter of the pipe header.
Figure 7:
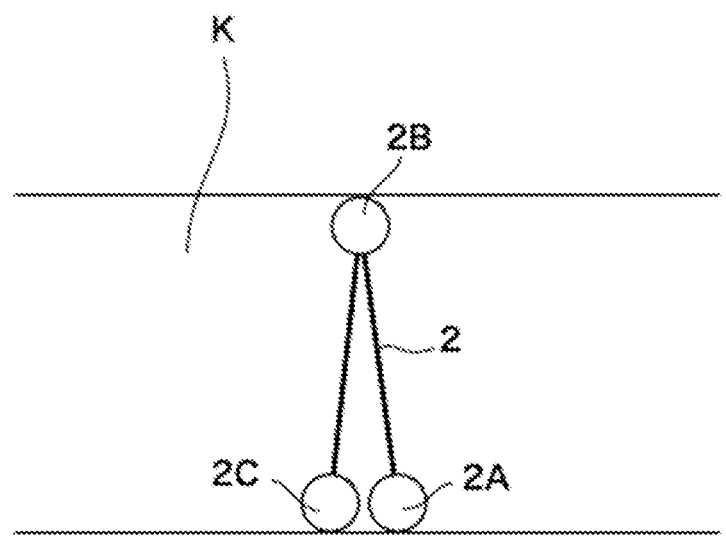
FIG. 7 is a schematic diagram illustrating a case in the prior art where, when the arm length is not sufficiently larger than the diameter of the pipe header at the time of the pipe interior moving device moving in the pipe header, the gripping of the wheel units on the wall inside the pipe header is not sufficient because the angle of the arms is small.

Air can also be used to control the bending force. With such a configuration, even when it becomes difficult to move the pipe interior inspection robot in the pipe header, the pipe interior inspection robot can be easily taken out of the pipe. As illustrated in FIGS. 1, 2, and 3, the moving means of the pipe interior inspection robot 1 includes the three sets of wheel units 2A, 2B, 2C, and at least one of the wheel units is driven by the motor. In the present embodiment, the wheel unit 2B located at the intermediate position includes a drive part (motor).

As illustrated in FIG. 3, the wheel unit which is driven by the motor includes a drive part 10 having a motor 5, a speed reducer 6, a coupling member 8, a cover cylinder 9, and the like, a wheel 7 coupled to a rotary shaft 11 of the motor 5 of the drive part 10 and rotationally supported by a bearing 14 on the cover cylinder 9, and the like. In a wheel unit not including the driving mechanism by the motor, basically, the same configuration as that of the wheel unit which is driven by the motor may be adopted except for portions related to the driving of the wheel unit, such as the motor 5 and the speed reducer 6. With this configuration, it is possible to perform functions necessary for the traveling in the pipe header and for the gripping onto the pipe wall in the pipe header. As will be described later, each of the wheel units 2A, 2C adjacent to the wheel unit located at the intermediate position among the three sets of wheel units 2A, 2B, 2C is coupled with the joint portions and is engaged with a coupling mechanism C constituting a link B that enables rotational movement around a yaw shaft. The wheel unit 2A located at the foremost in the traveling direction may have a structure capable of being coupled with a holding device D that holds a mechanism (e.g., water supply pipe) for inspecting a condition in a pipe to be inspected. Even when the wheel units 2A, 2C adjacent to the wheel unit 2B located at the intermediate position do not include the drive part 10, these wheel units each have a structure (e.g., each wheel unit may have a rotating axle, a traveling wheel, a stable position of the center of gravity for traveling, a material of required rigidity or the like) for enabling stable traveling and gripping onto the inside of the pipe header of the pipe interior inspection robot made up of three sets of wheel units 2A, 2B, 2C, but the general configuration thereof is considered to be well known, so that a detailed description thereof is not given.

As illustrated in FIG. 3, the motor 5 is a prime mover that receives a supply of electric power to generate mechanical power, and the configuration thereof is well known, so that a detailed description thereof is omitted here. The motor 5 illustrated in the present embodiment is housed inside a cylindrical tubular body, and a shaft projected to one side from the center of one end of the motor 5 is coupled with the rotary shaft 11 of the speed reducer 6 having a cylindrical shape and fixed to one side of the motor 5, and the rotary shaft 11 projected from the center of one end of the speed reducer 6. The speed reducer 6 reduces the rotation speed of the motor 5 appropriately and outputs the rotation speed from the rotary shaft 11, and the speed reducer 6 is mounted with the cover cylinder 9 to be configured integrally. A large-diameter part 9a is provided on the motor 5 side of the cover cylinder 9 by providing a step, and an appropriate gap is provided between the cover cylinder 9 and the motor 5 by the large-diameter part 9a.

On both sides of the cover cylinder 9 in the axial direction, two bearings 14A, 14B are mounted, the wheel 7 is rotatably supported via these bearings 14A, 14B, the wheel 7 is fixed to the rotary shaft 11 via the coupling member 8, and the wheel 7 is rotatably driven by the motor 5. The wheel 7 is made up of a ring-shaped metal wheel 15 and a rubber tire 16 integrally provided on the outer peripheral surface of the wheel 15. An outer ring of a bearing 14A fitted to the motor 5 side of the cover cylinder 9 is fitted to one side in the axial direction of the hole of the wheel 15, and an outer ring of a bearing 14B fitted to the rotary shaft 11 side of the cover cylinder 9 is fitted to the other side in the axial direction of the same hole.

A bearing presser 17 is screwed to the coupling member 8 side of the speed reducer 6 by a fixing screw 18, and the movement of the inner ring of the bearing 14B is prevented by the bearing presser 17. At the tip of the rotary shaft 11, the coupling member 8 for integrally coupling the rotary shaft 11 and the wheel 15 is screwed by a locking screw 19. The coupling member 8 is formed of a disk-shaped member having a through-hole at the center, and a flange 8a provided at the outer peripheral edge of the coupling member 8 is provided with a plurality of insertion holes through which the fixing screws 22 are inserted. By a plurality of fixing screws 22 inserted through these insertion holes, the outer peripheral edge of the coupling member 8 is fixed to the ring-shaped end face portion of the wheel 15.

The large-diameter part 9a of the cover cylinder 9 is fitted with a seal member 23 and a bearing 24 each having a ring shape. The seal member 23 is in sliding contact with the inner surface of the wheel 15 to prevent the leakage of lubricant and the like from the inside and the entry of water, dust, and the like from the outside for the space set inside the wheel 15. The bearing 24 is disposed on the outside of the seal member 23 with a predetermined gap, and the link A is attached to the drive part 10 so as to be rotationally movable via the bearing 24.

The pair of arms extending from the wheel unit 2B located at the intermediate position of the three sets to the adjacent wheel units 2A, 2C each have the link A portion attached to the side surface of the wheel unit 2B so as to be rotationally movable with respect to the drive part 10, extend in the directions of the adjacent wheel units 2A, 2C, and couple the wheel unit 2A at the front, the wheel unit 2B located at the intermediate position, and the wheel unit 2C at the last in the forward-moving direction so as to be rotationally movable, together with the joints and the link B portions.

The link A is made up of an annular part 26a having a ring shape and a plate-shaped member, for example, which is formed by extending from one side of the annular part 26a in a direction orthogonal to a motor rotary shaft. A cap 33 covering the outside of the motor 5 is integrally fixed to the annular part 26a of the link A by a plurality of fixing screws 34.

The wheel unit 2A has the holding device D, which is the mechanism for inspecting the condition in the pipe, ahead in the forward-moving direction, and a pipe interior inspection camera or the like can be attached to the holding device D. A cable for connection between a control device (controller) or the like and the pipe interior inspection robot 1 can be attached to the wheel unit 2C.

The cap 33 covers the outside of the motor 5 and has an end face 33a which is slightly larger than the motor 5 and has a circular shape, a cylindrical part 33b continuously and integrally provided on the outer peripheral edge of the end face 33a, and a flange 33c provided on the outer peripheral surface of the cylindrical part 33b so as to expand radially outward. A female screw part is provided on the inner peripheral surface of the opening-side end of the cylindrical part 33b of the cap 33, and a male screw screwed into the female screw part is provided on the outer peripheral surface of the opening-side end of the large-diameter part 9a of the cover cylinder 9. By screwing the female screw of the cylindrical part 33b to the male screw of the large-diameter part 9a, the cap 33 is screwed and integrally fixed to the cover cylinder 9.

The wheel 7 of the wheel unit 2B located at the intermediate position of the three sets is rotatably supported on the cover cylinder 9 of the drive part 10 via the two bearings 14A, 14B. Further, the wheel 7 is integrally configured with the rotary shaft 11 of the drive part 10 via the coupling member 8.

As described above, in the present embodiment, the wheel unit 2A at the front in the forward-moving direction at the time of inserting the pipe interior inspection robot into the pipe does not include the drive part (motor, reduction gear and the like). This is in order to facilitate the holding and operation of the water supply pipe that supplies water to the inlet of the pipe to be inspected when the mechanism for inspecting the condition in the pipe is provided with the holding device D for holding the water supply pipe. Similarly, the wheel unit 2C does not include the drive part for such a reason that the coupling mechanism C of the link B is attached.

Each of the link A portions of the arm, attached to the wheel unit 2B located at the intermediate position so as to be rotationally movable, extends in the direction of the adjacent wheel units 2A, 2C and is attached so as to be rotationally movable to the inside of the cap on the side surface of the vehicle of the wheel unit 2B located at the intermediate position. The pair of links A of the wheel unit 2B is preferably attached to different side surfaces of the drive part of the wheel unit 2B for stable traveling of the wheel unit 2B, but may be attached to the same side surfaces when the bending force between the pair of links A of the wheel unit 2B is applied by the spring, the coil, or the like. The link A member need not have a specific shape so long as having rigidity capable of withstanding a load imposed on the link A and a shape capable of dispersing the load, but may be, for example, a frame-shaped member made of a bar, a plate-shaped member, or the like.

Since the link A has a shape suitable for coupling with the joint, the coupling portion with the joint can have a shape corresponding to the coupling portion of the joint. The coupling between the link A and the joint may only be made by a method capable of fixing therebetween and can be made by a bolt, a nut, or the like.

The links B extending from the respective wheel units 2A, 2C other than the wheel unit 2B located at the intermediate position to the wheel unit 2B located at the intermediate position may have a structure (coupling mechanism C) capable of rotating the link B around a yaw shaft fixed and held in a vertical direction (vertical to a pipe-axis direction) to a lower portion 35B of the joint when the link B is coupled to the joint.

Next, the joint located between and engaged with the link A and the link B will be described.

As described above, the pair of arms connecting from the wheel unit 2B located at the intermediate position of the three sets to the adjacent wheel units extends, and the pair of arms includes the joints engaged with the links A extending from the wheel unit 2B located at the intermediate position to the wheel units 2A, 2C and the links B extending from the wheel unit located at the intermediate position to the respective wheel units. The joint is located between the link A and the link B, can rotate around the pitch shaft, and can be fixed. The joints are provided between the links A and B of the pair of arms connecting from the wheel units 2B located at the intermediate position of the three sets to the adjacent wheel units 2A, 2C. This allows the device to be easily inserted from the pipe base, which is the inlet of the pipe header, and moved to the position of the pipe to be inspected, even when the diameter of the pipe header is smaller than the distance between the wheels of the wheel units. Further, since the joint can be freely rotated and fixed around the pitch shaft orthogonal to the direction extending to the link A and the link B, it is possible to provide a pipe interior inspection robot having such superior characteristics that, when each wheel unit grips onto the wall inside the pipe header, with respect to the axle of the wheel unit 2B located at the intermediate position, the angle (opening angle) formed by the axles of the other adjacent wheel units 2A, 2C becomes sufficiently large, and stable traveling and gripping can be achieved.

Figure 9:
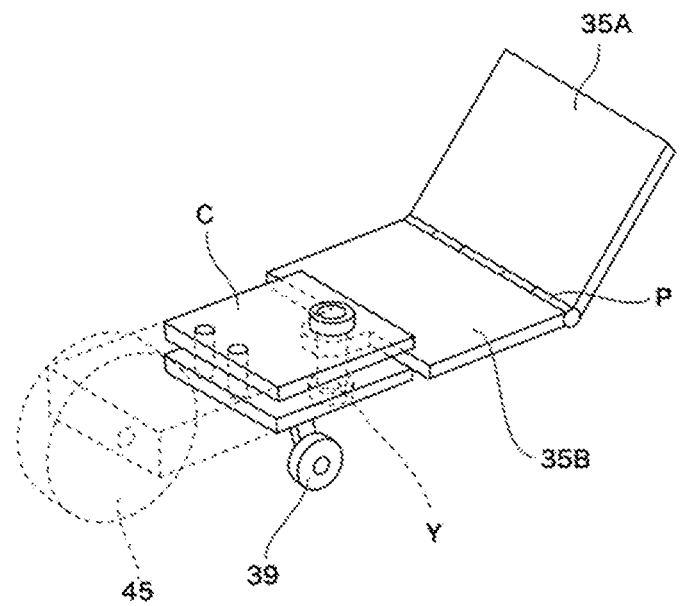
FIG. 9 is a perspective view of a coupling member of a link B in a (foremost or rearmost) wheel unit coupled with a lower portion 35B of the joint and adjacent to the wheel unit located at the intermediate position.
Figure 10:
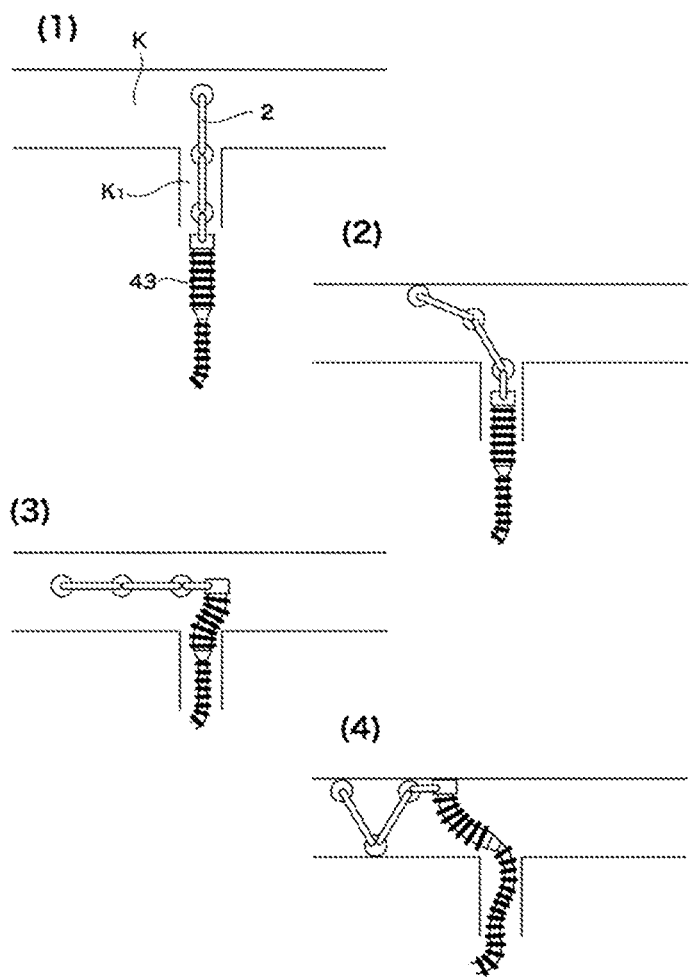
FIG. 10 illustrates examples of combination between a holding device and a mechanism (an example of a water supply pipe is illustrated in the figure) which is for inspecting a condition in a pipe to be inspected and is coupled to the three sets of wheel units.
Figure 11:
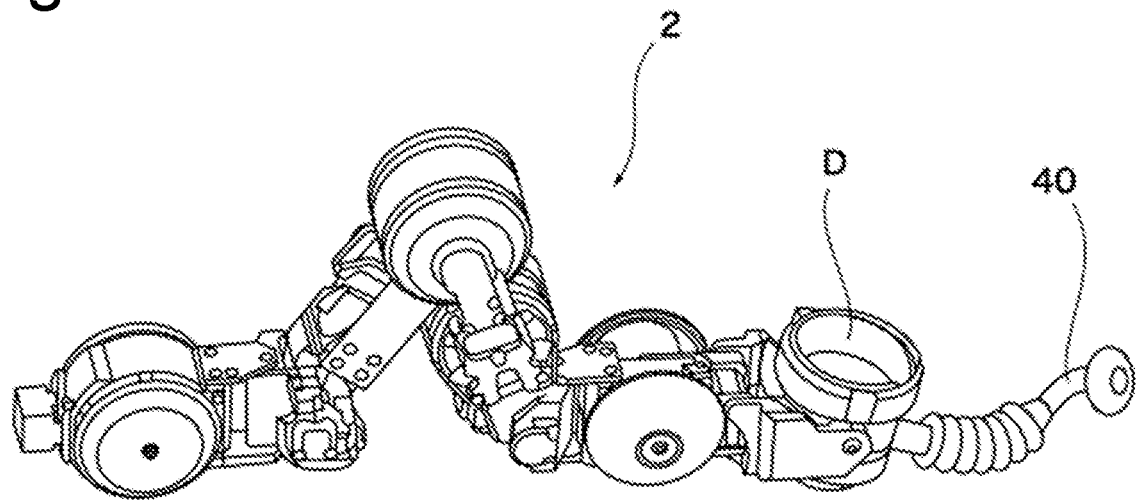
FIG. 11 is a diagram illustrating an example of a mechanism (an example of a pipe interior inspection camera is illustrated in this example) which is for specifying the position of the pipe to be inspected and is removably coupled to the mechanism (an example of the water supply pipe is illustrated in the figure) for inspecting the condition in the pipe to be inspected.
Figure 12:
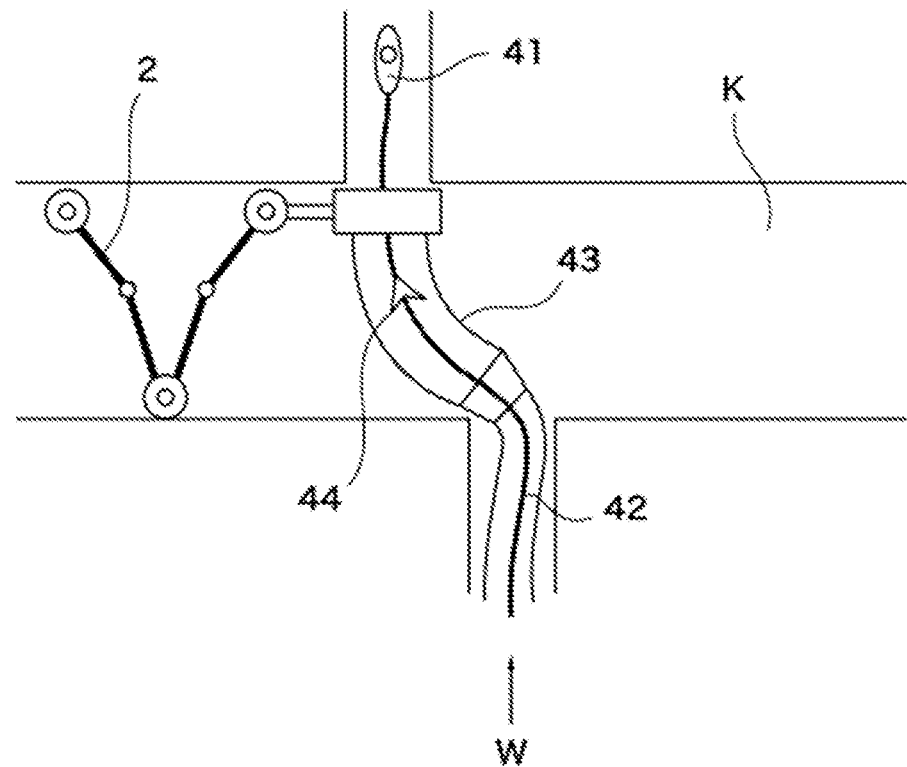
FIG. 12 is a diagram illustrating an example of a sensor which, in the mechanism (an example of the water supply pipe is illustrated in the figure) for inspecting the condition in the pipe to be inspected, is conveyed to a portion to be inspected in the pipe to be inspected by the flow of water allowed to flow in the water supply tube and is coupled to a cord having one or more protrusions that generate resistance to the water flow.

As illustrated in FIGS. 8 and 9, the joint includes an upper portion 35A coupled with the link A, a lower portion 35B coupled with the link B, and a pitch shaft P rotatably coupling the upper portion 35A and the lower portion 35B together around the axis, and a yaw shaft Y rotatably coupling the link B that couples the lower portion 35B to each of the adjacent wheel units 2A, 2C. A motor, an encoder, a torque limiter, and the like can be provided for rotating and controlling the upper portion 35A and the lower portion 35B around the pitch shaft. Further, a dustproof and waterproof cover member for protecting the joint portion from the influences of dust, water, and the like may be provided.

When the upper portion 35A coupled with a link A in the joint and the lower portion 35B coupled with the link B are rotated around the pitch shaft, and each wheel unit grips onto the wall inside the pipe header, the upper portion A and the lower portion B are rotated around the pitch shaft so that the two joints provided at the ends of the links A extending from the wheel unit 2B located at the intermediate position to both adjacent wheel units 2A, 2C approach each other. Further, in order to prevent the upper portion 35A coupled with the link A constituting the joint and the lower portion 35B coupled with the link B from being rotated in the direction in which the two joints move away from each other beyond the straight line coupling the two adjacent wheel units at the time of the gripping of the wheel units, the upper portion 35A of the joint coupled with the link A may be further extended beyond the pitch shaft toward the lower portion 35B.

Next, a description will be given of a function for locking the rotation of the three sets of wheel units when the three sets of wheel units come into pressure-contact with and grip onto the wall inside the pipe header by the bending force of the arm, and releasing the lock when the three sets are to be moved. Each wheel unit comes into pressure-contact with and grip onto the pipe wall as a result of the joint portion being bent by the spring, the coil, or the like around the pitch shaft. In order to maintain this condition, for example, a brake device (stopper) may be provided in the drive part so that the wheel of the wheel unit (in the present embodiment, the wheel unit 2B located at the intermediate position) including a drive motor does not rotate, and the brake device can be set or released by the operation of a control device outside the pipe header by using the cable connected to the three sets of wheel units. The other wheel unit may similarly include the brake device (stopper) in the drive part so long as being a wheel unit including the drive motor on the wheel other than the wheel unit located at the intermediate position, but in this case, the drive motor of the vehicle other than the wheel unit located at the intermediate position is naturally off, and the brake device (stopper) can be provided only in the drive part of the wheel unit 2B located at the intermediate position. When the three sets of wheel units are to be moved, the brake device (stopper) may be released to start the drive motor.

In order to release the gripping by removing the bending force of the arm when the three sets of wheel units grip on the wall inside the pipe header, the drive cable may be loosened to increase the rotation angle around the pitch shaft of the joint (increase the angle in the bending direction of the upper portion 35A and the lower portion 35B around the pitch shaft of the joint portion in a side view). And/or the arrangement of both arms may be adjusted so as to widen the angle formed by the links A extending from the wheel unit located at the intermediate positions to the respective different adjacent wheel units. In the present embodiment, the pitch shaft is fixed to the upper portion 35A of the joint, and the lower portion 35B is rotated around the pitch shaft. This is because the fixing of the upper portion 35A and the pitch shaft in the joint facilitates the rotation control around the pitch shaft. The pitch shaft may be fixed to the lower portion 35B, and the upper portion 35A may rotate around the pitch shaft.

The shape and material of the upper portion 35A of the joint portion to be coupled with the link A are not limited so long as being suitable for rotatably coupling the upper portion 35A and the lower portion 35B together around the pitch shaft, and the central portion may be hollow and have a frame shape. However, assuming a case where the spring, the motor, the encoder, or the like for controlling the rotation operation of the pitch shaft is attached, it is preferable that at least a part of the central portion has a plate-like region. The same applies to the lower portion 35B coupled with the link B.

In the present embodiment, the upper portion 35A and the lower portion 35B of the joint are both formed in a substantially plate shape.

Needless to say, the structure and the material of the upper portion 35A and the lower portion 35B of the joint can sufficiently bear the load applied to the link A and the link B at the time of traveling and gripping of the wheel units. As illustrated in the present embodiment, considering that it is preferable for the gripping of the wheel units 2A, 2C, and the like, that the yaw shaft engaged with the link B be substantially vertical to the forward-moving direction of the wheel units, it is desirable that the engagement of the lower tip portion of the lower portion 35B with the link B be substantially horizontal and orthogonal to each yaw shaft when viewed from the side surface direction of each of the wheel units 2A, 2C. However, the shape of the lower portion 35B may be such that the lower portion 35B of the joint rises in the pitch-shaft direction at a certain angle with respect to the yaw shaft disposed vertically to the pipe wall in the side view in order to make the height of the joint portion from the lower wall in the pipe header adjustable corresponding to the diameter of the pipe header. In this case, the position of the joint on the arm needs to be such that, in a side view, the angle between the upper portion 35A and the lower portion 35B of the joint needs to be formed to enable the wheel unit 2B located at the intermediate position and coupled to the link A coupled to the joint to come into pressure-contact with the upper wall in the pipe header. Thus, by changing the shape of the lower portion 35B of the joint coupled with the coupling mechanism C of the link B, the degree of freedom of the arrangement relationship between the wheel units can be increased to facilitate dealing with the pipe headers having different inner diameters.

The coupling mechanism C of the link B is the lower portion 35B of the joint and can house the yaw shaft for rotatably coupling the coupled wheel units around the shaft, a motor for relatively rotating the joint around the yaw shaft, an encoder for controlling the rotation of the motor, and the like.

Next, a rotating mechanism around the yaw shaft driven by a motor will be described with reference to FIGS. 8 and 9. The yaw shaft is fixed to the lower portion 35B of the joint to rotatably couple the wheel units 2A, 2C together around the yaw shaft through the coupling mechanism C of the link B. Specifically, the coupling mechanism C of the link B can be said to be a mechanism for keeping the yaw shaft vertical to the pipe-axis direction and rotating the wheel units 2A, 2C coupled to the coupling mechanism of the link B around the yaw shaft through the coupling mechanism C by rotation by the motor disposed around the yaw shaft. Each of the wheel units 2A, 2C can move forward (or move backward) in a direction the same as, or horizontally different from, the forward-moving (or backward-moving) direction of the wheel unit 2B located at the intermediate position (i.e., the vertical plane in the direction orthogonal to the shaft center of the wheel unit 2B located at the intermediate position) in accordance with the rotation around the yaw shaft from the forward-moving (or backward-moving) direction of the wheel unit 2B located at the intermediate position and can grip onto the wall in the pipe header more accurately. At the time of inserting the device and the three sets of wheel units from the pipe base which is the inlet of the pipe header, each of the wheel units 2A, 2C other than the wheel unit 2B located at the intermediate position can be rotated around the yaw shaft.

The position of placement of the motor in the coupling mechanism C of the link B which is rotated around the yaw shaft is not limited so long as enabling the coupling mechanism C to be rotated around the yaw shaft, but it is convenient to provide the motor in the coupling mechanism C of the link B. Note that the rotational power around the yaw shaft of the motor may be transmitted by a transmission method (gear, belt or the like) suitable for the placement relationship between the motor and the yaw shaft. Further, providing a mechanism for controlling the rotation of the link B around the yaw shaft enables the stopping, fixing, and the like of the rotation at an arbitrary position.

When equipment is provided for measuring the angle of the two links A extending from the wheel unit 2B located at the intermediate position to the adjacent wheel units 2A, 2C, the arrangement relationship of the three sets of wheel units can be more accurately known in the pipe header by matching the angle formed by the upper portion 35A and the lower portion 35B around the pitch shaft of the joint, and the traveling and gripping of the three sets of wheel units can be performed in a more eligible manner.

When the motor is used to rotate the upper portion 35A and the lower portion 35B around the pitch shaft orthogonal to the direction of the moving-ahead (forward-moving) direction of the wheel unit 2B located at the intermediate position, the rotary drive motor around the pitch shaft may be disposed on either the upper portion 35A or the lower portion 35B of the joint so long as being capable of rotating the upper portion 35A and the lower portion 35B. When the rotation around the pitch shaft can be controlled by another method, the mechanism for rotating around the pitch shaft does not necessarily have to be the motor.

In the present embodiment, the coupling mechanism C has a structure for extending in a direction sandwiching the axles of the wheel units 2A, 2C from above and below and is made up of two, upper and lower, members in which the width of the extending portion is within the length of the rotary shaft of each wheel unit, and a coupling member having a shape to support the two members and orthogonally fixed thereto. The coupling member C has a substantially H-shape when viewed from the side thereof, is held by the axle of the wheel unit via a bearing, is rotatable around the yaw shaft in the vertical direction to the rotary shaft (axle) and the forward-moving direction of the wheel unit, and is engaged around the yaw shaft, fixed to the lower portion 35B of the joint, so as to be rotationally movable at a portion coupled to the joint portion. The structure of the coupling mechanism C constituting the link B and the coupling of the coupling mechanism to each of the wheel units 2A, 2B may be such that the yaw shaft goes straight to the rotary shaft (axle) and the forward-moving direction of the wheel units and can be rotated around the yaw shaft, and for example, a supporting wheel may be provided in a portion of the lower plate-like member of the coupling mechanism C near the lower portion 35B of the joint so that the coupling mechanism C is supported on the axle of each of the wheel units 2A, 2C via the bearing and held horizontally in the forward-moving direction (FIG. 9).

In the present specification, an expression such as "go straight" assumes that the intersecting angle is set within a certain range centering on 90°, and it is most preferable to form a construction so as to have an intersecting angle of 90° in a precise sense.

With such a constitution of the coupling mechanism C, the wheel units 2A, 2C can be rotated in the yaw shaft direction. A drive motor for rotating each of the wheel units 2A, 2C around the yaw shaft may be provided, and the motor can be provided on both or one of the wheel units 2A, 2B.

By the control of the motor for driving the joint, the joint can be freely rotated around the yaw shaft and fixed at an arbitrary position.

By engaging the drive motor with a gear (spur gear, bevel gear or the like) or the like, each of the wheel units 2A, 2C can be freely rotated around the yaw shaft, and each of the wheel units 2A, 2B can be fixed at an arbitrary position to come into pressure-contact with and grip onto the pipe wall inside the pipe header.

Next, a description will be given of the control of the three sets of wheel units 2A, 2B, 2C which are the moving means of the pipe interior inspection robot, in particular, the operation and control of the joints provided in the arms connecting the respective wheel units. The three sets of wheel units are driven by the motor to travels in the pipe header. In the present embodiment, only the intermediate wheel unit 2B is provided with the drive motor, but the same description applies to a case where the other wheel units are provided with the drive motors.

The traveling (driving) in the pipe header of each of the three sets of wheel units 2A, 2B, 2C can be controlled from the outside of the pipe header by the control device connected to the wheel units by the cable. Whether the three sets of wheel units 2A, 2B, 2C are in pressure-contact with and grip on the pipe wall inside the pipe header, and the like, can be known by measuring the angle formed by the upper portion 35A and the lower portion 35B around the pitch shaft of the joint and the angle between the two links A linked to the intermediate wheel unit 2B. The turning angle with respect to the forward-moving direction of the wheel units 2A, 2C around the yaw shaft can be known by providing a measuring device around the yaw shaft, so that stable traveling and proper gripping of the wheel units 2A, 2B, 2C can be achieved.

In a second embodiment of the pipe interior inspection robot of the present invention, the wheel unit, which is the moving means, may include four or more wheel units.

Figure 14:
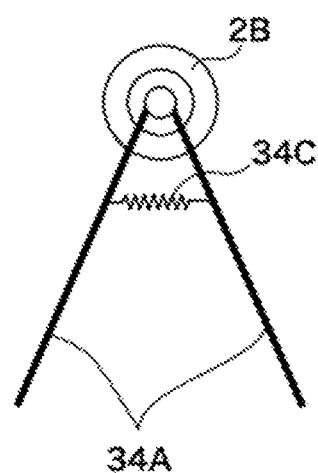
FIG. 14 illustrates an example of a spring mechanism provided between two links A extending in directions from the wheel unit located at the intermediate position toward two adjacent wheel units.
Figure 15:
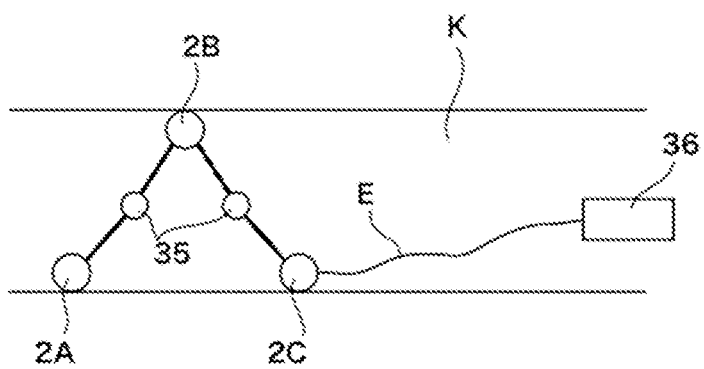
FIG. 15 is a schematic diagram illustrating the relationship among a moving means of the pipe interior inspection robot, a bending generator, and a control device (controller) for controlling each vehicle unit.

Next, with reference to FIGS. 13 to 17, the generation of the bending force in the pipe interior moving means of the pipe interior inspection robot will be described. In the pipe interior moving means, the bending force is obtained by providing the joint at the intermediate position of the arm and connecting each wheel unit adjacent from the wheel unit 2B located at the intermediate position, and by adjusting the angle formed by the two arms extending from the wheel unit 2B located at the intermediate position to the respective adjacent wheel units 2A, 2C, thus ensuring the traveling of the three sets of wheel units and the gripping thereof onto the pipe wall inside the pipe header (FIGS. 13 and 15).

Figure 16:
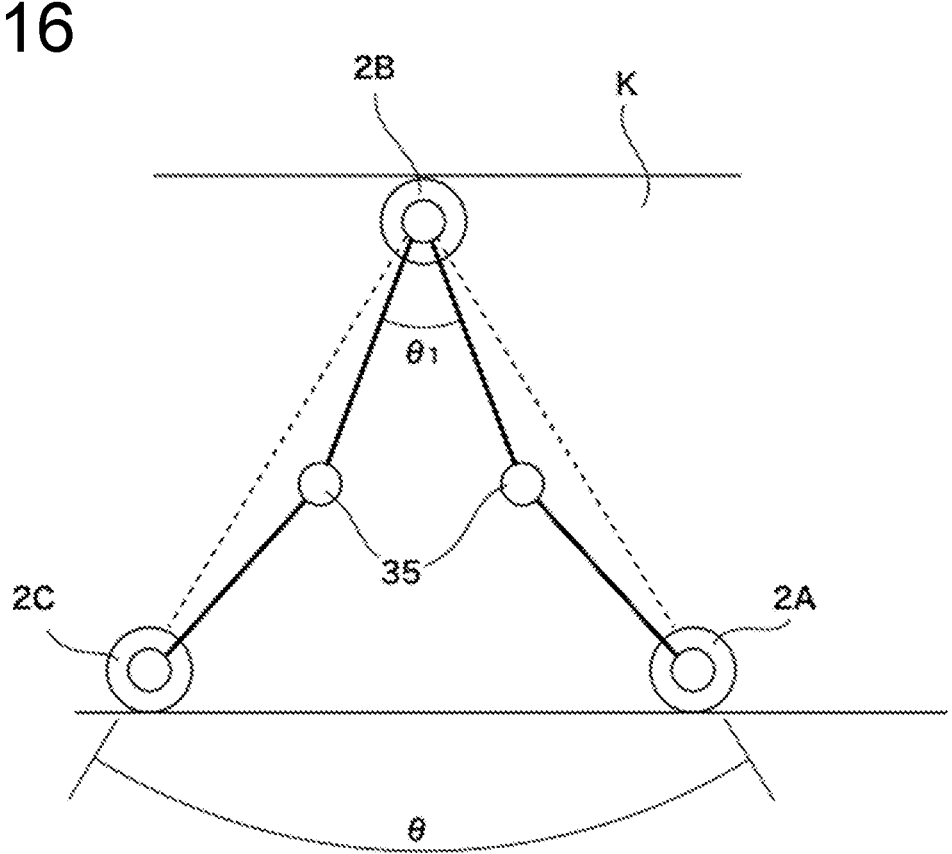
FIG. 16 is a schematic diagram illustrating the relationship between angles θ1 and θ in a gripping state when the arm is bent due to rotational movement of a joint of each vehicle unit constituting the moving means of the pipe interior inspection robot.

In the present application, such a bending force is generated by providing the pitch shaft in the horizontal direction at the joint portion provided on the arm, and rotating the link A and the link B of the arm around the pitch shaft at the joint portion so that the two joint portions provided between the wheel unit located at the intermediate position of three sets and the respective adjacent wheel units approach each other (FIG. 16).

Figure 17:
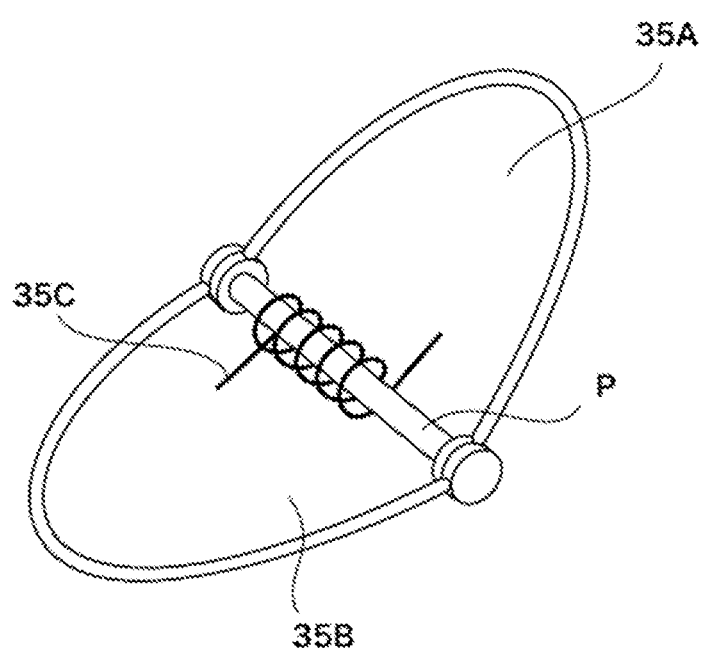
FIG. 17 is a schematic diagram of a case where a spring is used for a rotational movement of a joint.
Figure 18:
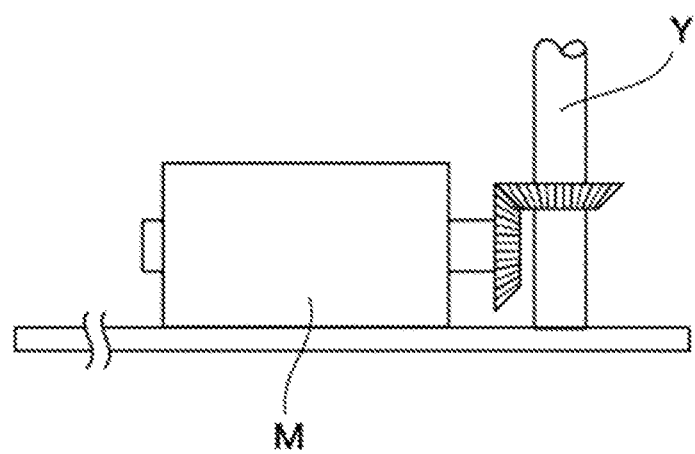
FIG. 18 is a schematic diagram illustrating a mechanism for rotationally moving a yaw shaft with a motor.

In this case, the upper portion 35A and the lower portion 35B of the joint can also be rotationally moved around the pitch shaft, for example, by providing a mechanism for energization by a spring in advance. The upper portion 35A and the lower portion 35B is rotationally moved by the spring around the pitch shaft normally by energizing the spring so as to increase the angle formed by the bending direction (a direction to avoid bending) of the upper portion 35A and the lower portion 35B of the joint, and the bending force can be adjusted from the outside of the pipe header by the control device coupled by the drive cable obtained by providing the adjacent wheel units 2A, 2C via the wheel unit 2B located at the intermediate position (FIGS. 15 and 17). With such a configuration, the angle of the upper portion 35A and the lower portion 35B of the joint can be freely adjusted, and in a case where the drive cable is cut by any chance or some other case, the gripping of the three sets of wheel units on the pipe wall of the pipe header can be released, and the pipe interior inspection robot can be taken out of the pipe. Providing the mechanism for energization by the spring and adjustment by the drive cable enables the two arms to be bent by moving the two joints in the direction in which the joints approach each other. Regarding the angle between the two links A coupled to the wheel unit 2B located at the intermediate position of the three sets, the bending force can be appropriately adjusted by the adjustment of the distance between the two links A by providing the spring, the coil, or the like, together with the rotational movement of the upper portion 35A and the lower portion 35B around the pitch shaft in the direction in which the two joint portions approach each other (FIG. 14).

When the bending force is to be adjusted, a control cable E coupled to the joint on the wheel unit 2C side through a cable support provided in the upper portion of the wheel unit 2B located at the intermediate position from the joint on the wheel unit 2A side, and a control device coupled to the cable E and installed outside the pipe header are used. By operating the control device so that the angle between the two arms of the wheel unit 2B located at the intermediate position and/or by increasing the angle in the bending direction of the upper portion 35A and the lower portion 35B of the joint energized by the spring, the pressure-contact with and gripping on the wall inside the pipe header by the wheel units 2A, 2C can be released (FIGS. 13, 15, and 17). The cable E may include a spring or the like. When equipment for measuring the angle is provided in the wheel unit 2B located at the intermediate position, the angle necessary to release the pressure-contact with and gripping on the wall by the wheel units 2A, 2C can be known in accordance with the diameter of the pipe header. Further, in the mechanism described above for generating the bending force, the rotation and the angle of the upper portion 35A and the lower portion 35B around the pitch shaft can be controlled by providing the motor and the encoder. The rotational movement and the control of the two arms attached to the wheel unit 2B located at the intermediate position can be controlled by providing the motor, the encoder, and the torque limiter. It is also possible to combine the rotation and the angle of the upper portion 35A and the lower portion 35B around the pitch shaft and the rotational movement and the control of the two arms attached to the wheel unit 2B located at the intermediate position. The fixing of the pitch shaft fixed to the upper portion 35A of the joint can be made a removable structure, such as a bolt. With the above structure, it is possible to select a spring having a driving force (urging force) in consideration of the diameter of the pipe header, the lengths of the link A, the length of the link B, and the like, and it is possible to achieve more accurate traveling of the wheel units and gripping thereof onto the pipe wall inside the pipe header.

As the "mechanism for specifying the position of the pipe to be inspected", it is possible to use a pipe interior inspection camera that is attached to the holding device D connected to the wheel unit 2A. The pipe interior inspection camera is capable of remote monitoring from the outside of the pipe header by using a cable and is capable of specifying the position of the pipe to be inspected, and as a result, the water supply pipe can be accurately attached to the pipe to be inspected. The pipe interior inspection camera may be equipped with a meter counter, which automatically indicates the distance traveled by the inspection cable, so that the forward-moving state of the three-wheel unit can be confirmed by the control device connected by the cable. Further, the pipe interior inspection camera can be provided with a bearing wheel for feeding and winding the cable, and the cable can be smoothly taken in and out. In addition, inserting the spring in the camera tip enables the entry even in a tortuous and complicated place without any problem. By making the holding device D rotatable 180 degrees around the forward-moving direction of the vehicle, the water supply pipe can be accurately attached to the pipe to be inspected.

The "mechanism for inspecting the condition in the pipe" includes a sensor inserted into the pipe to be inspected and inspecting the condition of the pipe to be inspected and a water supply pipe for conveying the sensor to the pipe to be inspected by water supply. The type of the sensor is not limited so long as corresponding to the purpose of inspecting the condition of the pipe to be inspected, for example, detecting the thickness of the pipe to be inspected by ultrasonic waves. The sensor is connected with a cord for the operation, control, and the like of the sensor from the outside of the pipe header, and the cord is provided with one or more protrusions that generate resistance to water flow. Further, the water supply pipe for conveying the sensor to the pipe to be inspected by water supply has a structure for covering the vicinity of the inlet of the pipe to be inspected so that water does not leak when the water supply pipe is attached to the pipe to be inspected. This structure is arranged so that the traveling of the three sets of wheel units, which are moving means in the pipe header, and the gripping of the three sets of wheel units on the pipe wall inside the pipe header cause no trouble. As a structure for covering water so as not to leak, an adsorption board or the like which adsorbs to the pipe wall can be used. Further, a funnel-shaped water recovery device can be attached around the attachment portion in the pipe to be inspected of the water supply pipe.

Even when the diameter of the pipe header is smaller than the distance between the wheels of the wheel units in the pipe interior inspection robot having the structure and function as thus described, the device can be easily inserted from the pipe base, which is the inlet of the inspection hole of the pipe header (the insertion hole of the device) and be moved to the position of the pipe to be inspected, and when each wheel unit grips onto the pipe wall of the inside of the pipe header in the pipe, the angle (opening angle) formed by the first (front) and third (last) wheel units becomes sufficiently large with respect to the axles of the intermediate (second) wheel units, so that it is possible to achieve stable traveling and gripping.

The present invention is not limited to the above-described embodiment, and various modifications can be made without departing from the spirit of the present invention. In addition, it is also possible to arbitrarily combine the features described in the plurality of embodiments.

Further, although the embodiment has been described with a boiler pipe as an example, the present invention can be applied to, for example, pipe for oil, gas, chemical plants, nuclear power, water and sewage, pipe for various heat exchangers, and the like.

DESCRIPTION OF REFERENCE SIGNS

2 PIPE INTERIOR INSPECTION ROBOT
2A, 2B, 2C wheel unit
5 motor
6 reduction gear
7 wheel
9 cover cylinder
10 drive part
11 rotary shaft
26a annular part of link A
33 cap
34A link A
34B link B
34C spring between links A
35 joint
35A upper portion of joint
35B lower portion of joint
35C spring of joint
36 control device
37 rotary shaft of wheel unit 2A
38 bearing of rotary shaft of wheel unit 2A
39 supporting wheel
40 inspection camera
41 sensor
42 cord
43 water supply pipe
44 protrusion
45 wheel of the wheel unit 2A
C coupling mechanism
D holding device
E control cable
K pipe header
K1 pipe header inlet (pipe base)
P pitch shaft
W water flow
Y yaw shaft
M yaw shaft rotation motor

The invention claimed is:

1. A pipe interior inspection robot for inspecting an inside of a pipe branched from a pipe header, the robot comprising:
 1) a moving means having a structure capable of being introduced from a pipe base that is an inlet of the pipe header and capable of moving in the pipe header and being fixed to a pipe wall inside the pipe header at a desired position;
 2) a mechanism for specifying a position of a pipe to be inspected;
 3) a mechanism for inspecting a condition inside the pipe to be inspected; and
wherein the mechanism for inspecting the condition inside the pipe to be inspected includes a water supply pipe for supplying water to the inlet of the pipe to be inspected, and a sensor for evaluating the condition inside the pipe to be inspected, being conveyed into the pipe by utilizing a water flow generated by supplying water into the water supply pipe.

2. The pipe interior inspection robot according to claim 1, wherein
 the moving means includes
 at least three sets of wheel units, and
 a pair of arms connecting from a wheel unit located at an intermediate position of the three sets to adjacent wheel units,
 the pair of arms each have
 a link A extending from the wheel unit located at the intermediate position to each of the wheel units,
 a link B extending from each of the wheel unit to the wheel units located at the intermediate position, and
 a joint located between the link A and the link B, being freely rotated, and fixable at an arbitrary position, and
 a coupling is made to the adjacent wheel units via the pair of arms each having the link A, the link B, and the joint located between the link A and the link B.

3. The pipe interior inspection robot according to claim 2, wherein the joint includes a mechanism for rotating around a pitch shaft and a mechanism for rotating around a yaw shaft.

4. The pipe interior inspection robot according to claim 3, wherein the joint has a motor for driving the joint on the yaw shaft.

5. The pipe interior inspection robot according to claim 1, wherein the moving means has a function for locking rotation of the three sets of wheels when the three sets of wheel units are in pressure-contact with and grip on the pipe wall inside the pipe header by a bending force of the arms, and for releasing the lock when the three sets of wheel units are to be moved.

6. The pipe interior inspection robot according to claim 1, wherein when the moving means grips on a pipe wall inside the pipe header by a bending force of the arms and the three sets of wheel units, the moving means is able to remove the bending force of the arms to release the gripping.

7. The pipe interior inspection robot according to claim 1, wherein the sensor for evaluating the condition in the pipe to be inspected includes a sensor for detecting a thickness of the pipe to be inspected by using ultrasonic waves, and a cord that extends from the sensor and be equipped with one or more protrusions generating resistance to the water flow.

8. The pipe interior inspection robot according to claim 1, wherein the mechanism for inspecting the condition in the pipe to be inspected has a structure for covering a vicinity of the inlet of the pipe to be inspected so as to prevent water leakage.

\* \* \* \* \*